United States Patent [19]
Wolf

[11] Patent Number: 5,688,474
[45] Date of Patent: Nov. 18, 1997

[54] DEVICE FOR TREATING GASES USING MICROFABRICATED MATRIX OF CATALYST

[75] Inventor: Eduardo E. Wolf, University of Notre Dame, Notre Dame, Ind. 46556

[73] Assignee: Eduardo E. Wolf, Granger, Ind.

[21] Appl. No.: 379,304

[22] Filed: Jan. 27, 1995

Related U.S. Application Data

[63] Continuation-in-part of Ser. No. 69,510, Jun. 1, 1993, abandoned.
[51] Int. Cl.⁶ .................................................. B01D 50/00
[52] U.S. Cl. ............................ 422/170; 422/171; 422/177; 422/190; 422/212; 437/187; 437/203; 502/300; 502/439
[58] Field of Search .................................... 422/170, 171, 422/177, 190, 211, 212; 437/187, 203; 502/439, 240, 242, 259, 261, 260, 300; 219/521, 501

[56] References Cited

U.S. PATENT DOCUMENTS

| | | |
|---|---|---|
| 3,579,814 | 5/1971 | Dill, Jr. ................................ 437/187 |
| 3,672,983 | 6/1972 | De Witt et al. ........................ 437/187 |
| 3,837,907 | 9/1974 | Berglund et al. ..................... 437/187 |
| 3,840,982 | 10/1974 | Schuster et al. ...................... 437/187 |

OTHER PUBLICATIONS

A.C. Krauth, K.H. Lee, G.H. Bernstein and E.E.Wolf, Articles entitled "A Novel Micorfabricated Pd/SiO2 Model Catalyst for theHydrogenation of 1,3–Butadiene" submitted for publication.

*Primary Examiner*—Christopher Kim
*Attorney, Agent, or Firm*—Baker & Daniels

[57] ABSTRACT

A method of microfabricating a matrix of evenly distributed catalytic articles, with the matrix then being used to treat reactants in a stream of gases. The matrix is created by depositing areas of conductive material on a nonconductive base wafer or substrate, and then depositing catalyst particles in electrical communication with the conductive material so that a series of localized electrical fields can be created upon the introduction of a power source. A dielectric material surrounding the catalyst particles can be altered by increasing the applied voltage, thereby increasing the strength of the electrical field. A device so constructed is placed in a stream of gases, and the localized electrical fields alter the selectivity and the reactivity of the reactants in the stream of gases.

10 Claims, 7 Drawing Sheets

FIG. 7
CURRENT VS. VOLTAGE FOR THE MICROFABRICATED CATALYST

FIG. 8

RESISTANCE VS. TEMPERATURE FOR THE MICROFABRICATED CATALYST

DEVICE FOR TREATING GASES USING MICROFABRICATED MATRIX OF CATALYST

BACKGROUND AND SUMMARY OF THE INVENTION

This is a continuation-in-part of U.S. patent application Ser. No. 08/069,510, filed Jun. 1, 1993, abandoned.

This invention relates to a method for forming a supported catalytic matrix through microfabrication. This invention also relates to a method of treating gases by passing the gases over the microfabricated matrix of catalytic particles that have been electrically connected to create localized electrical fields. Further, this invention relates to a catalytic device containing localized electrical fields between catalytic particles that is used for treating gases. The localized electrical fields act to orient the reactants in a gas stream relative to the catalytic beads, thereby enhancing the effect of the catalyst.

Metal catalysts have many practical uses in today's world. The most common example for consumers exists in the catalytic converters found on nearly all road vehicles manufactured since 1976. A typical catalytic converter includes a porous substrate that has a large quantity of finely divided catalytic metals impregnated therein which convert noxious engine exhaust fumes into non-polluting emissions.

The reactive surfaces of catalytic metals present in vehicular catalytic converters, as well as in numerous other applications, are typically created by embedding the finely divided metal catalyst particles in a porous carrier. While this embedding process maximizes the available surface area, the embedding processes currently used do not provide a uniform distribution of the catalytic particles, nor do the processes provide catalytic particles of a precise composition or uniform surface area. Therefore, tight control of a reaction is difficult to achieve. Further, because the surface area of the porous carrier, and hence the reactive surface area of the catalytic metal, varies from one fabricated device to another, it is difficult to reproduce the precise work function of the catalyst from one device to the next.

The construction of a microfabricated catalytic matrix allows for the precise control of the available surface area of catalytic metal, and accordingly the microfabricated device allows tighter control over chemical reactions. Further, the introduction of an electrical current into the microfabricated catalytic matrix alters the work function of the catalyst, thereby affecting the chemical reaction taking place within the gas stream as the gas passes over the catalytic matrix.

However, a uniform electrical field cannot be created without the benefit of an evenly distributed catalytic matrix. The embedding processes presently available do not allow for uniform size or distribution of the catalyst particles, nor do they provide for the electrical connection between catalyst particles within the porous carrier in order to create one or more controllable localized electrical fields.

This invention provides for a method of microfabricating metal catalyst matrix that can be formed according to a predetermined pattern in order to maximize efficiency. The present method further provides a means to control the size, configuration, composition, and distribution of the metal catalyst particles within the matrix. Also, the present invention provides a method to treat reactants contained in a stream of gas flowing along a path, and provides a method to control the orientation of the reactants in the gas stream relative to the catalyst particles through the use of one or more controlled localized electrical fields within the catalytic matrix, thereby improving the selectivity and altering the time and temperature of a chemical reaction. Finally, the present invention provides for a device that when inserted into a stream of gas and energized, works to increase the efficiency, lower the temperature, and shorten the reaction time of one or more chemical reactions.

The invention includes the fabrication of a catalytic matrix which has a base substrate and at least two areas of electrically conductive metal bonded to the base substrate but isolated from each other by a dielectric material. Each area of electrically conductive material has a plurality of catalytic metal particles or beads bonded to the areas of conductive material to form a pattern or matrix, with each bead being surrounded on its edges by the layer of dielectric material to form a series of rows. In the matrix so formed, alternate rows of catalytic beads are connected to each other by the underlying conductive metal, with the dielectric material further surrounding and separating each bead from beads in the adjacent row.

The invention further includes the placement of the fabricated matrix into a stream of gas to treat the reactants in the gas. The reactants in the gas pass over the catalyst beads in the matrix, while a power source connected to the matrix creates a series of electrical fields between the catalyst beads on adjacent rows.

Accordingly, it is an object of this invention to provide for a method of fabricating a microfabricated catalyst matrix.

Another object of this invention is to provide a method for treating gases through the use of a microfabricated catalyst matrix.

A further object of this invention is to provide for a device that can be inserted into a stream of gases in order to alter the reaction time of reactants in the gas.

A still further object of this invention is to alter the work function of metal catalysts in a matrix by creating a series of localized electrical fields.

Other objects of the invention will become readily apparent to those skilled in the art upon a reading of the following description.

BRIEF DESCRIPTION OF THE DRAWINGS

FIG. 3 is also intended to illustrate the shape of the first level photomask used to define the configuration of the underlying conductive layer.

DESCRIPTION OF THE PREFERRED EMBODIMENT

The preferred embodiment described herein is not intended to be exhaustive or to limit the invention to the precise form disclosed. It is chosen and described to explain the principles of the invention and its application and practical use in order to best enable others skilled in the art to follow its teachings.

Figures 1, 2, 3, 4, 5:
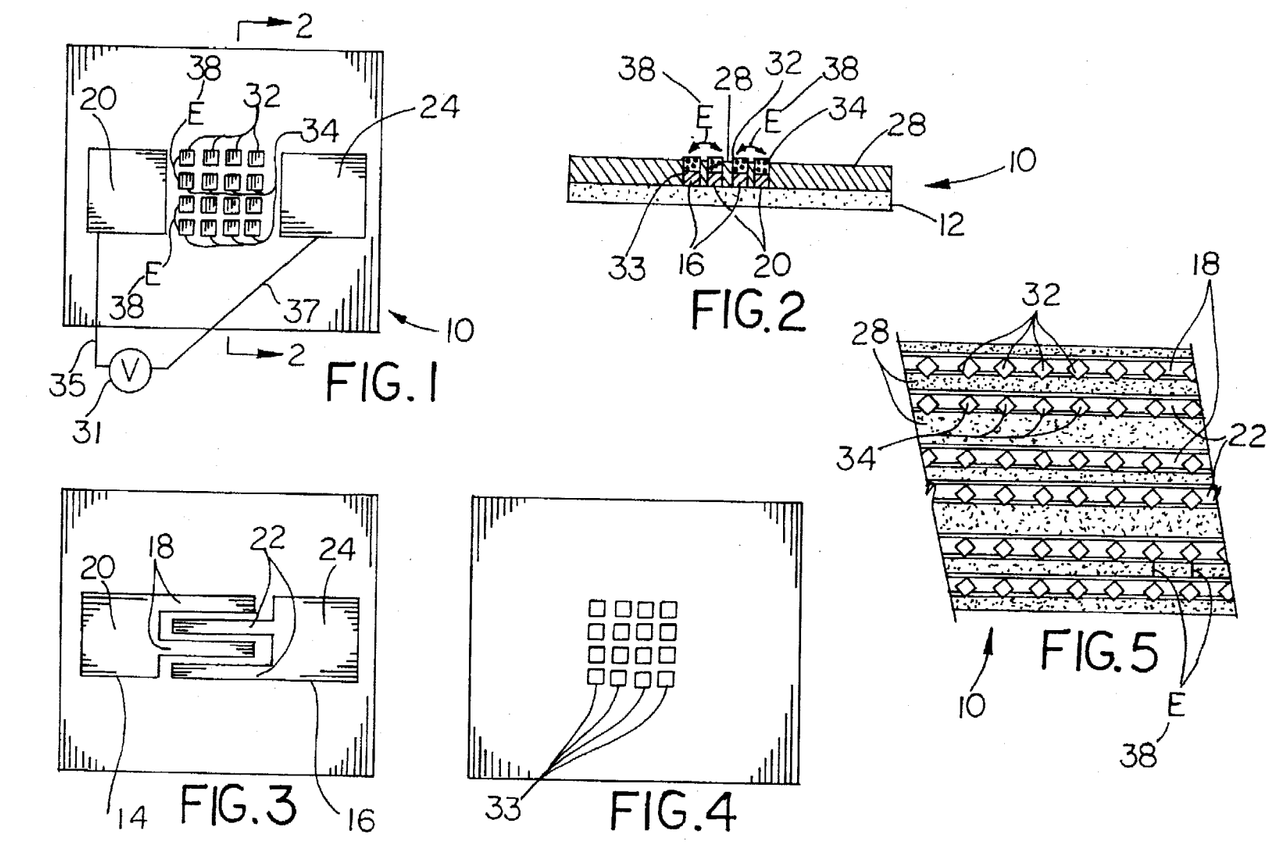
FIG. 1 is a plan view of a microfabricated catalyst device assembled according to this invention.
FIG. 2 is a sectional view of the microfabricated catalyst device taken along line 2—2 of FIG. 1 illustrating the rows of catalytic beads attached to the underlying conductive material.
FIG. 3 is a plan view of the device shown in FIGS. 1 and 2 illustrating the device during fabrication after a layer of electrically conductive material has been deposited on the substrate and then partially removed leaving two separate areas of conductive metal.
FIG. 4 is a plan view of the of the second level photomask used to define the shape and location of the deposited catalyst beads.
FIG. 5 is an fragmentary plan view drawn from an optical micrograph of the device shown in FIG. 1, illustrating a portion of the catalyst matrix in greater detail.

Referring now to the drawings, reference numeral 10 generally indicates a microfabricated catalyst device assembled according to the present invention. The device 10 is comprised of a rigid substrate 12 formed of a silicon wafer or any other suitable rigid material. First and second areas 14, 16 of electrically conductive material are bonded or otherwise affixed to the substrate 12. First area 14 includes a plurality of conductive rows 18 and a terminal part 20. Second area 16 includes a plurality of conductive rows 22 and terminal part 24. A plurality of catalyst beads 26 are deposited along the conductive rows 16 and 20 of first area 14 and second area 16 at predetermined intervals. Each catalyst bead 26 is in electrical communication with conductive rows 16 or 20 of the underlying first or second area 14 or 16 of electrically conductive material.

Catalyst beads 26 may consist of a single metallic element or an alloyed compound. Further, catalyst beads 26 may be formed of different metals or alloys. Some common metal catalysts include, without limitation, nickel, tin, titanium, palladium, platinum, rhodium, precious metals, transition metals, and in some cases the alkali and alkaline earth metals, including alloys of the above. Thus different catalysts may be deposited at each interval along conductive rows 16 or 20 as dictated by the specific catalyst or catalysts required for a particular application.

Dielectric material 28 covers the substrate 12 and separates conductive rows 16 from conductive rows 20, and further separates and surrounds the edges of catalyst beads 26. Dielectric material 28 contains a plurality of openings 33 which expose one surface of catalyst beads 26. The size and configuration of the catalyst bead 26 is determined by the size and configuration of the opening 33 in the surface of dielectric material 28. As such, the exposed surface area of the catalyst beads 26 can be precisely controlled from one fabricated device to the next. The plurality of catalyst beads 26 form a matrix 30 as shown in greater detail in FIG. 5.

In order to alter the work function of the catalyst, the microfabricated catalytic matrix is connected to an electrical source in order to create localized electrical fields between adjacent rows of catalytic metal particles. As illustrated in FIGS. 1, 2 and 5, a power source 31 is connected by a pair of leads 35, 37 to terminal part 18 and 22 respectively of first and second areas 14 and 16 of electrically conductive material. A voltage potential is thereby established between a first set 32 of beads 26 and a second set 34 of beads 26, which creates a plurality of localized electrical fields 38, which are generally indicated by an "E", between adjacent catalyst beads 24 of the first set 32 and of the second set 34.

Figure 7:
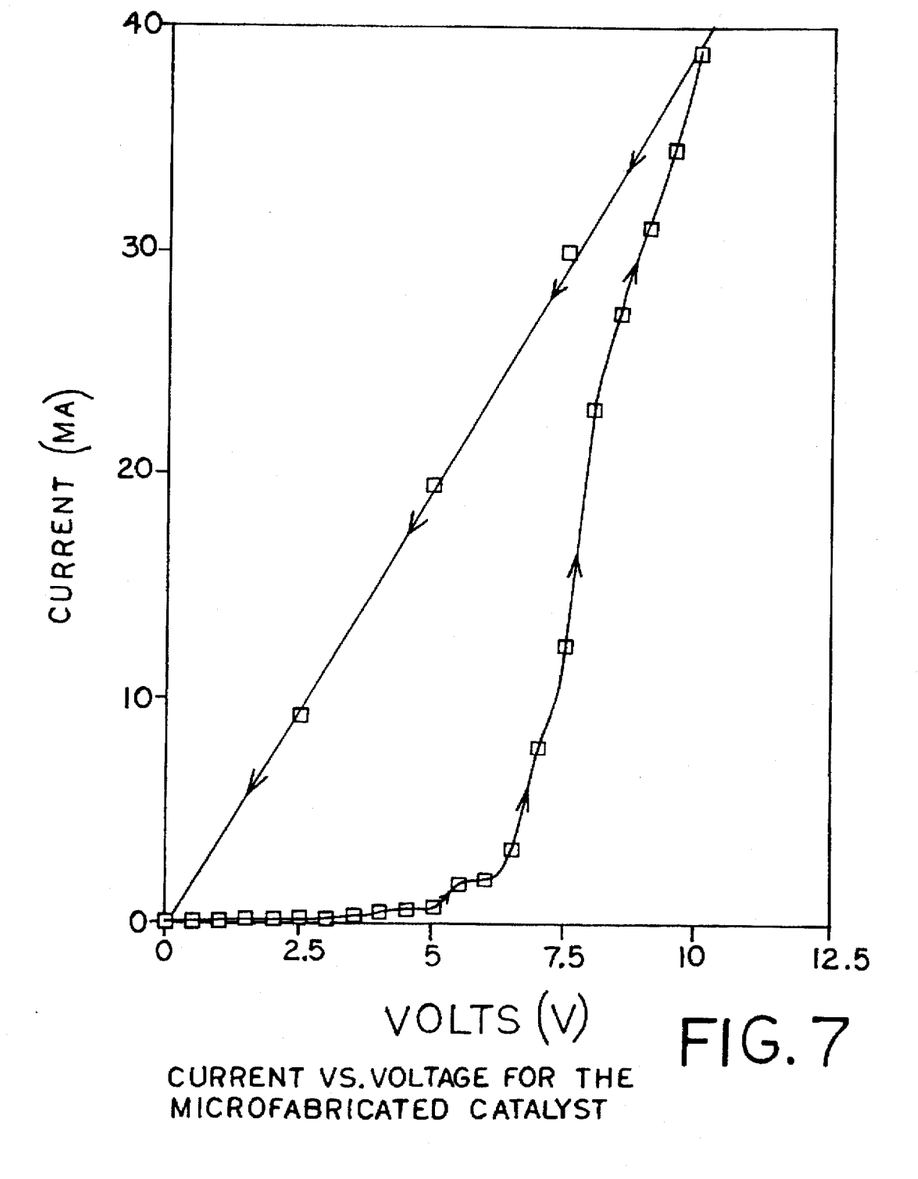
FIG. 7 is a plot of current/voltage showing the amount of current flowing through the dielectric material between adjacent catalyst beads.

The current/voltage plot for the microfabricated matrix is shown in FIG. 7. At low voltages, the dielectric material 28 between adjacent beads 26 exhibit a high resistance to electrical current. Hence the current between adjacent beads 26 of the first set 32 and the second set 34 is low, and the strength of the each localized electrical field 38 is low. As the voltage between rows 18 and 22 is increased past a certain point, the dielectric material between adjacent beads 32 and 34 orients itself with respect to the electrical field, and hence the resistance is lower thereby allowing an increase in the electrical current between adjacent beads of the first and second set. When the voltage is decreased back to zero, the polyamide film does not relax back to its original configuration, and the resistance remains low.

Figure 8:
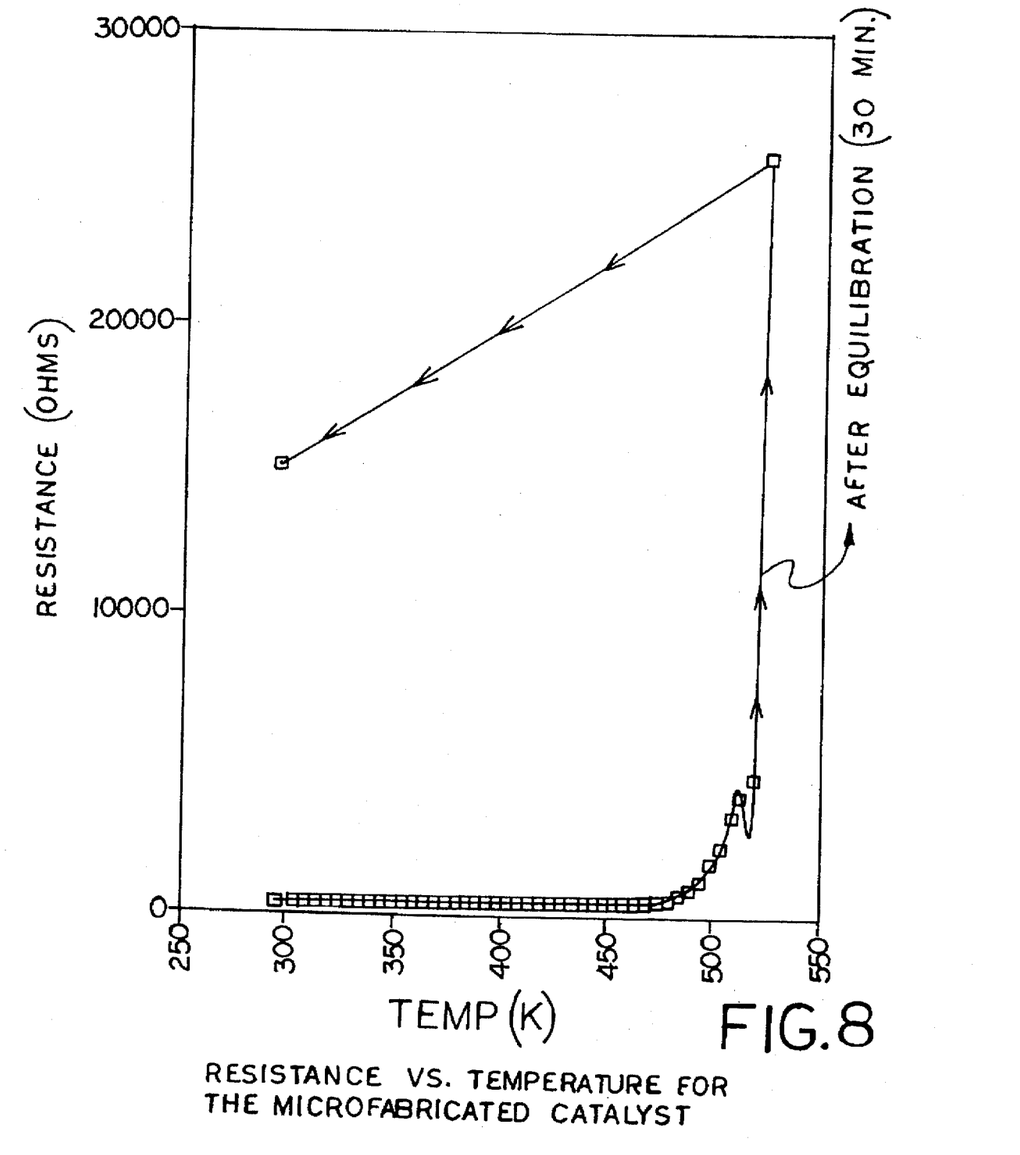
FIG. 8 is a plot of temperature/resistance showing the annealing process of restoring the dielectric material to its original resistance.

Reorienting the film requires annealing of the catalyst as shown in FIG. 8. After allowing the sample to equilibrate in nitrogen for 30 minutes at 250 C., the resistance of the polyamide film increases to point above its original resistance, and then upon cooling the original resistance of the film is restored.

Figure 6:
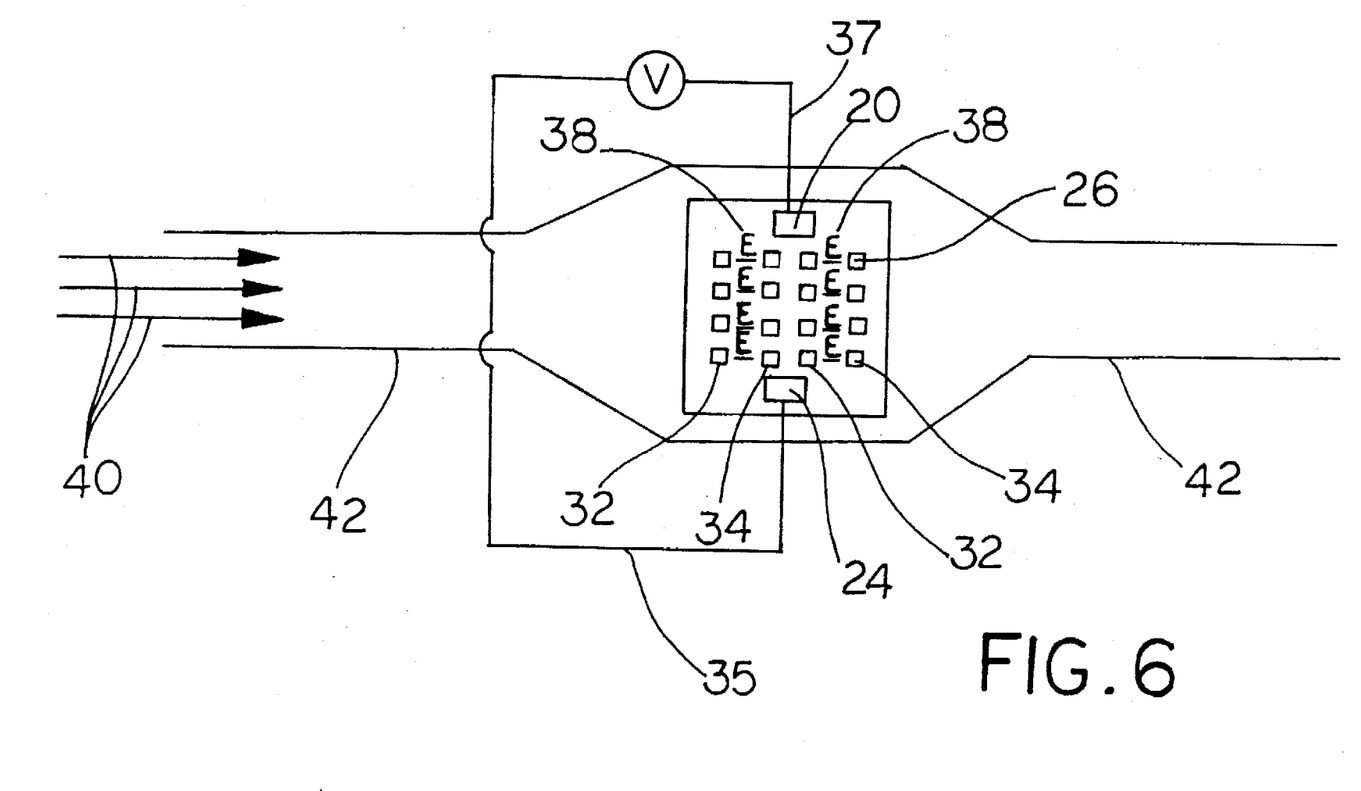
FIG. 6 is a view of the catalyst matrix positioned in a stream of gases so that the gases flow over the catalyst beads.

As shown in FIG. 6, the device 10 is placed in a stream of gases 40, such as the exhaust gas stream of an internal combustion engine. The stream of gas flows through a flow path 42, which is defined by a pipe or conduit or other suitable means of conveying gases along a desired path. Chemical reactants (not shown), such as pollutants, contained in the stream of gases 40 are thus communicated over the catalyst beads 26 in the matrix 30, so that the catalyst beads 30 affect one or more chemical reactions taking place within the stream of gases 40. As the stream of gases 40 flows through the flow path 42, the reactants pass over the matrix 30 of beads 26. As the power supply 31 is increased or decreased, the strength of the electrical field 38 varies. As the electrical field 38 gets stronger, the path of the reactants is increasingly influenced by the electrical field 38, thus altering the selectivity of the catalyst, improving the efficiency of the catalyst, and promoting lower reaction temperatures and shorter reaction times.

The general steps of the process used to fabricate and use the carrier 10 have been outlined above. The following example of an actual procedure is provided to illustrate the method of fabrication in greater detail, but is not intended to limit the invention to the steps given.

EXAMPLE

A <<100>> silicon wafer was first cleaned using the RCA cleaning method. The wafer was then placed in a high temperature furnace and heated for about 3 hours at approximately 1100° C. in an oxygen environment. After removal, a layer of silicon dioxide about 2,000 angstroms thick coated the wafer. A layer of aluminum was deposited onto the oxide surface at a thickness of 2000–3000 angstroms. The wafer was then baked at 125° C. for 30 minutes, then placed on a vacuum chuck. A primer consisting of equal amounts of hexamethyldisilazane (HMDS) and xylene was applied to the wafer which is then spun at 5000 rpm for 30 seconds to evenly distribute the primer and dry the wafer. A layer of NPR was then applied to the wafer and spun at 1000 rpm for 5 seconds and then at 5000 rpm for 30 seconds. The NPR layer was about 800 nm thick. The wafer was again baked at 85° C. for 30 minutes to drive off any remaining solvents. The first level photomask was then positioned about the wafer and brought into contact with the wafer through a contact aligner. The NPR was then exposed by directing very collinear UV light onto the photomask for 5 seconds. Only the NPR in contact with the transparent regions of the mask are exposed. The wafer was then immersed for 70 seconds in developer, 20 second in xylene, and 20 seconds in isopropanol to develop the NPR. The wafer was then washed to remove the unexposed NPR and the wafer baked at 135° C. for 20 minutes to remove solvents and improve adhesion of the wafer and the NPR. The aluminum was then etched with a solution of phosphoric acid, nitric acid, acetic acid and wetting agents. The aluminum portions covered with NPR are not touched. The final pattern of aluminum is thus the opposite of that of the photomask. The NPR was then removed by using NPR stripper. The wafer at this stage resembles the configuration of FIG. 3. A layer of liquid glass was deposited onto the wafer and spun at high speed to evenly distribute the glass. The glass formed was about 3000 angstroms thick and acted as a dielectric between the aluminum areas. The wafer was then baked at 100° C. for 15 minutes and at 400° C. for 60 minutes in a nitrogen atmosphere.

The steps of priming, applying NPR and the first bake are then repeated using the second level photomask shown in FIG. 4, and the exposed glass is etched with buffered hydrofluoric acid. NPR covered areas are protected. Then the NPR was removed by a stripper.

Nickel, the chosen catalyst for this example, was then deposited into the square holes or openings 33 in the glass by electroplating. The larger terminal areas of the aluminum were covered to prevent deposition of nickel. The electroplating bath was maintained at about room temperature and a current of 25 mA run through for about 2 minutes. An optical micrograph of the catalyst is shown in FIG. 5 with the nickel particles in contact with the exposed aluminum layer. The individual particles of nickel were about 4 microns in diameter and separated by 4 micron distances.

Figure 9:
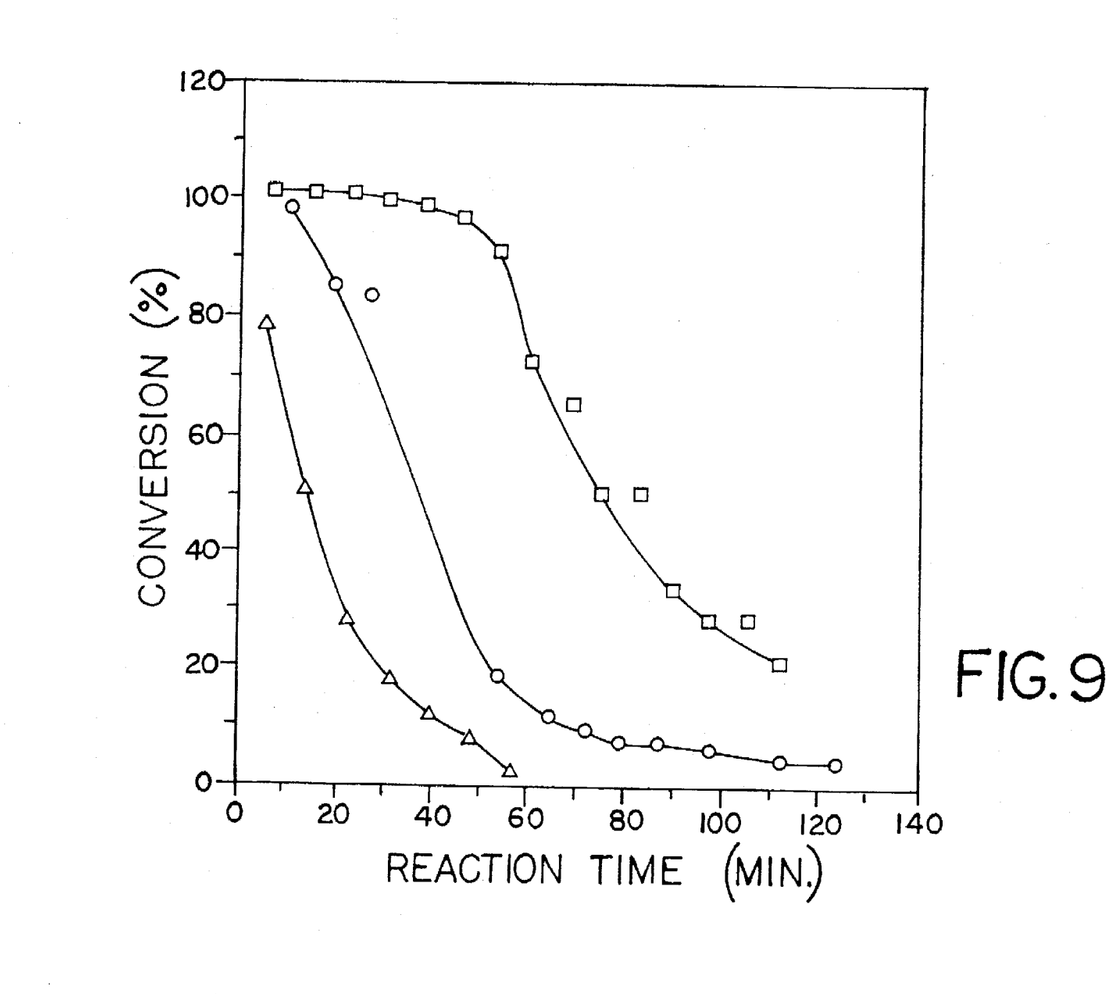
FIGS. 9–11 are graphical representations of the effect of the catalyst matrix on a butadiene conversion reaction.
Figure 10:
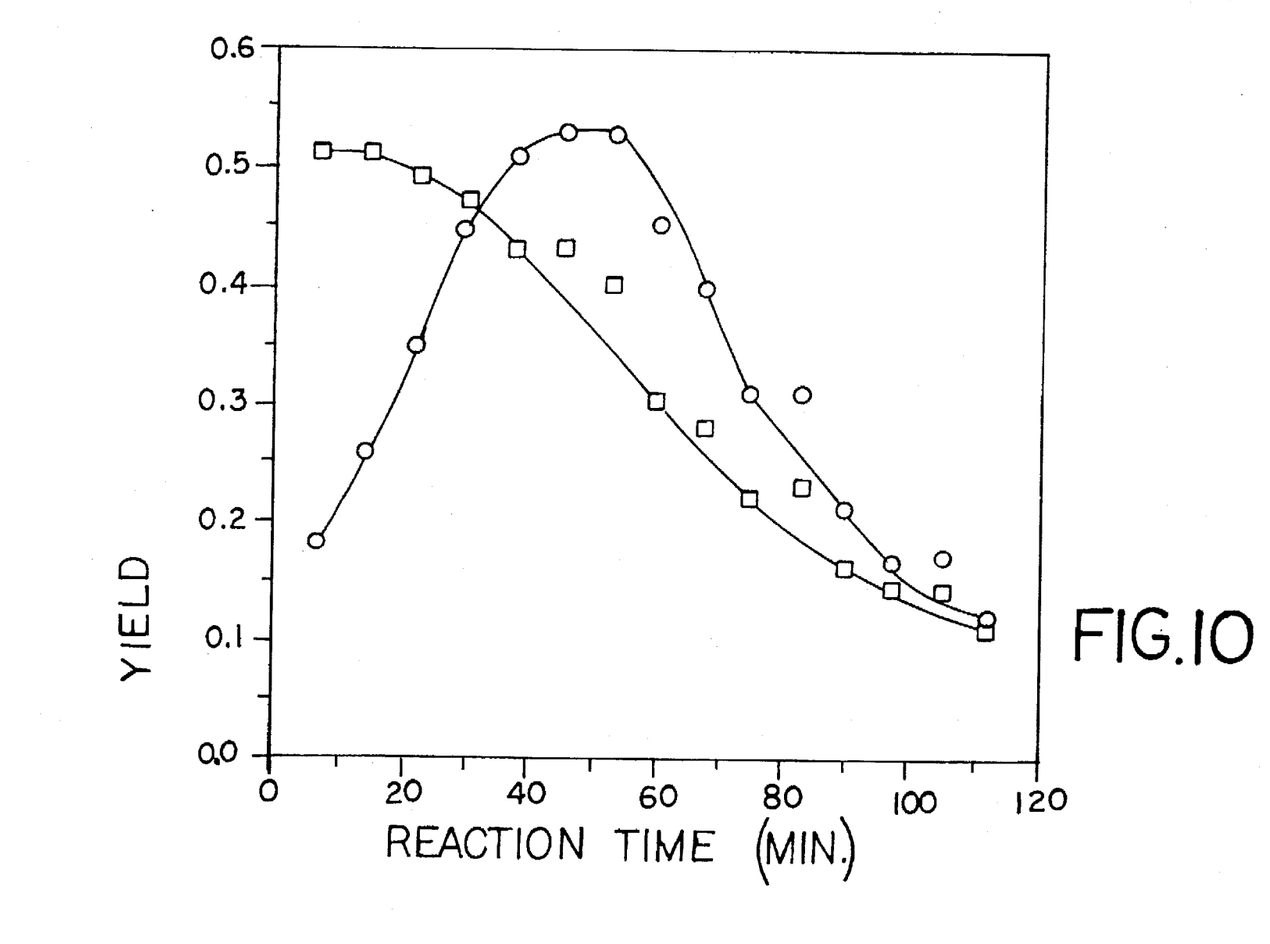
Figure 11:
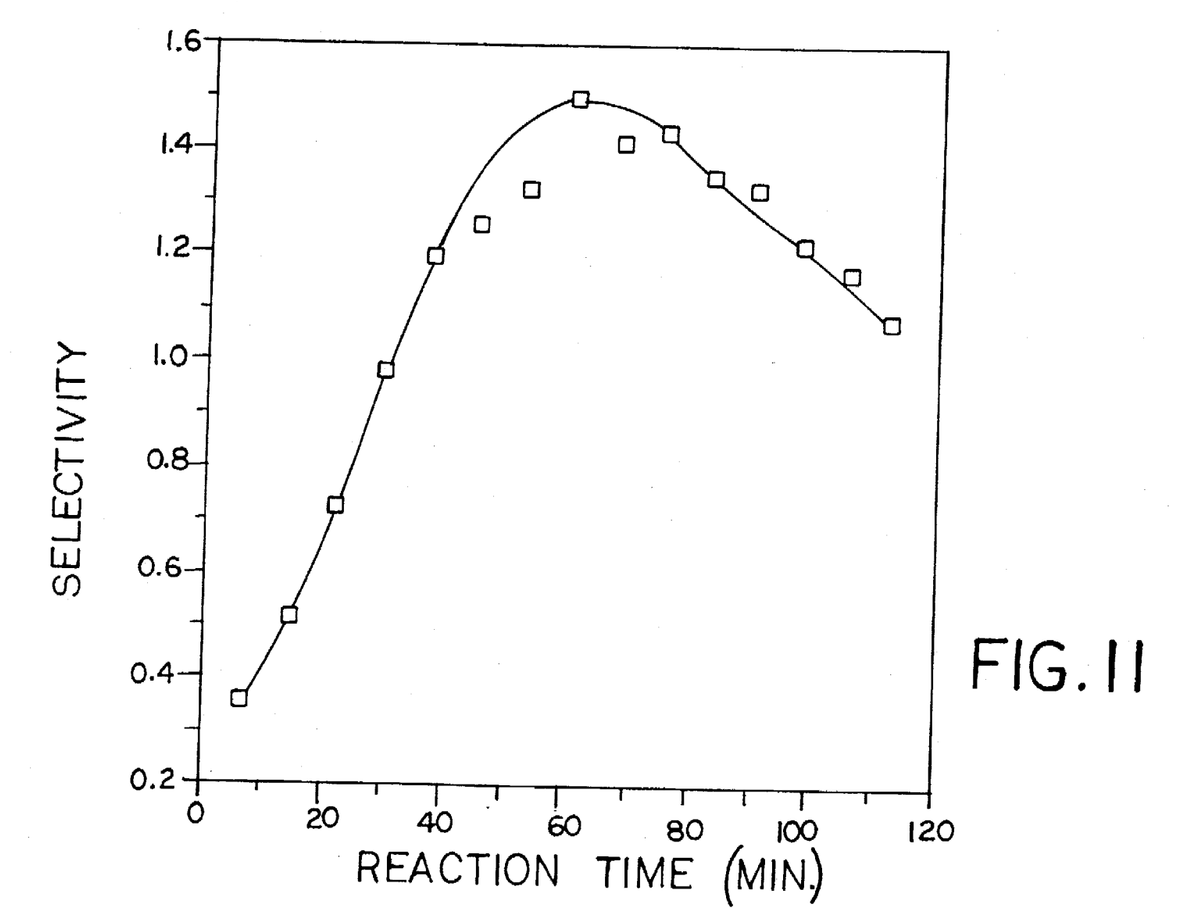

The carrier produced by the above example was placed in a reaction vessel with a quantity of hydrogen and butadiene at a ratio of 125:1. The results of the reaction are depicted graphically in FIGS. 9–11.

The above description does not limit the invention to the precise details above-given, but may be modified within the scope of the following claims.

I claim:

1. A device for treating gases comprising a flow path for said gases, a matrix of catalyst beads disposed in such flow path, said catalyst beads deposited on a nonconductive base substrate in a predetermined pattern, said matrix of catalyst beads further being divided into a first set and a second set, said first set including a plurality of catalyst beads in electrical communication with each other, and said second set including a plurality of catalyst beads in electrical communication with each other, and supply means for creating an electrical field between said beads while said gases are communicated over said beads, wherein said electrical energy creates an electrical field between one of said catalyst beads of said first set and a corresponding one of said catalyst beads of said second set, whereby said electrical fields orients reactants in said gases relative to said catalyst beads, said catalyst beads of said first set comprising a first catalytic metal and the catalyst beads of said second set comprising a second catalytic metal, said second catalytic metal being of a dissimilar metal than said first catalytic metal, said first set and said second set of said catalyst beads being separated by a dielectric material, said dielectric material inhibiting flow of electrical current between one of said catalyst beads of said first set and a corresponding one of said catalyst beads of said second set, thereby limiting the strength of said electrical field.

2. A device for treating gases as claimed in claim 1, wherein each of said catalyst beads is of a uniform shape.

3. A device for treating gases as claimed in claim 1, including variable supply means for increasing the strength of the electrical field in said dielectric material thus lowering the resistance of said dielectric material, to thereby increase the flow of electrical current between one of said catalyst beads of said first set and the corresponding one of said catalyst beads of said second set, thereby increasing the strength of said electrical field.

4. The device as claimed in claim 2, wherein said metal catalyst is selected from the group of materials that include nickel, tin, titanium, palladium, platinum, rhodium in the transition metals.

5. The device as claimed in claim 1, where in said base wafer is formed of silicon, and said cover layer is silicon dioxide.

6. The device as claimed in claim 1, wherein said layer of dielectric material is formed of a spin on glass material and silicon dioxide.

7. A device for treating gases comprising of base substrate, a layer of electrically conductive material overlying a surface of said base substrate, a layer of dielectric material overlying said layer of electrically conductive material, said layer of dielectrical material having a plurality of openings exposing said layer of electrical conductive material, and a metal catalyst house in said dielectric material within said plurality of openings, said metal catalyst in electrical communication with said layer of electrically conductive material, said base substrate including a semiconductive base wafer, and a cover layer formed of a dielectric material deposited on a surface of said base wafer, said layer of electrically conducted material overlying said cover layer, a first opening of said plurality of openings housing a first metal catalyst, and a second opening of said plurality of openings housing a second metal catalyst of a different composition than said first metal catalyst.

8. The device as claimed in claim 7, wherein said metal catalyst is selected from the group of materials that includes nickel, tin, titanium, palladium, platinum, rhodium, and the transition metals.

9. The device as claimed in claim 7, wherein said base wafer is formed of silicon, and said cover layer is silicon dioxide.

10. The device as claimed in claim 9, wherein said layer of dielectric material is formed of a spin on glass material and silicon dioxide.

* * * * *